(12) United States Patent
Sortore et al.

(10) Patent No.: US 7,471,022 B2
(45) Date of Patent: Dec. 30, 2008

(54) MAGNETIC BEARING

(76) Inventors: Christopher K. Sortore, 5456 Crystal Creek Dr., Roanoke, VA (US) 24018; Robert Jett Field, 49 Bethel Rd., Fincastle, VA (US) 24090; Victor Iannello, 2623 Bobwhite Dr., Roanoke, VA (US) 24018; Kirk Treubert, 4520 Summerset Cir., Roanoke, VA (US) 24018

( * ) Notice: Subject to any disclaimer, the term of this patent is extended or adjusted under 35 U.S.C. 154(b) by 272 days.

(21) Appl. No.: 11/525,398

(22) Filed: Sep. 22, 2006

(65) Prior Publication Data

US 2008/0073993 A1  Mar. 27, 2008

(51) Int. Cl.
*H02K 7/09* (2006.01)
*H02K 9/22* (2006.01)

(52) U.S. Cl. .................... 310/71; 310/90.5; 310/216; 310/254

(58) Field of Classification Search ............... 310/71, 310/90.5, 216, 254
See application file for complete search history.

(56) References Cited

U.S. PATENT DOCUMENTS

| | | | |
|---|---|---|---|
| 4,080,012 A | 3/1978 | Boden | |
| 4,245,869 A | 1/1981 | Scheffer | |
| 5,013,987 A | 5/1991 | Wakui | |
| 5,355,042 A | 10/1994 | Lewis | |
| 5,565,722 A | 10/1996 | Rubner | |
| 5,578,880 A | 11/1996 | Lyons | |
| 5,760,510 A | 6/1998 | Nomura | |
| 5,939,807 A * | 8/1999 | Patyk et al. | 310/89 |
| 6,380,652 B1 * | 4/2002 | Ueyama et al. | 310/90.5 |
| 6,472,787 B1 | 10/2002 | Komeno | |
| 6,617,734 B2 | 9/2003 | Taniguchi | |
| 6,809,450 B1 | 10/2004 | Morrison | |
| 7,023,118 B1 | 4/2006 | Morrison | |

* cited by examiner

*Primary Examiner*—Karl Tamai
*Assistant Examiner*—David W. Scheuermann
(74) *Attorney, Agent, or Firm*—Michael Haynes; Michael Haynes PLC; Dale R. Jensen

(57) ABSTRACT

Certain exemplary embodiments comprise a system, which can comprise a radial magnetic bearing static portion. The radial magnetic bearing static portion can comprise a plurality of electromagnets. The radial magnetic bearing static portion can comprise a plurality of pulse width modulated amplifiers, each of which can be adapted to provide electrical energy to a corresponding electromagnet of the plurality of electromagnets.

20 Claims, 12 Drawing Sheets

6000

9000

10000

11000

MAGNETIC BEARING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
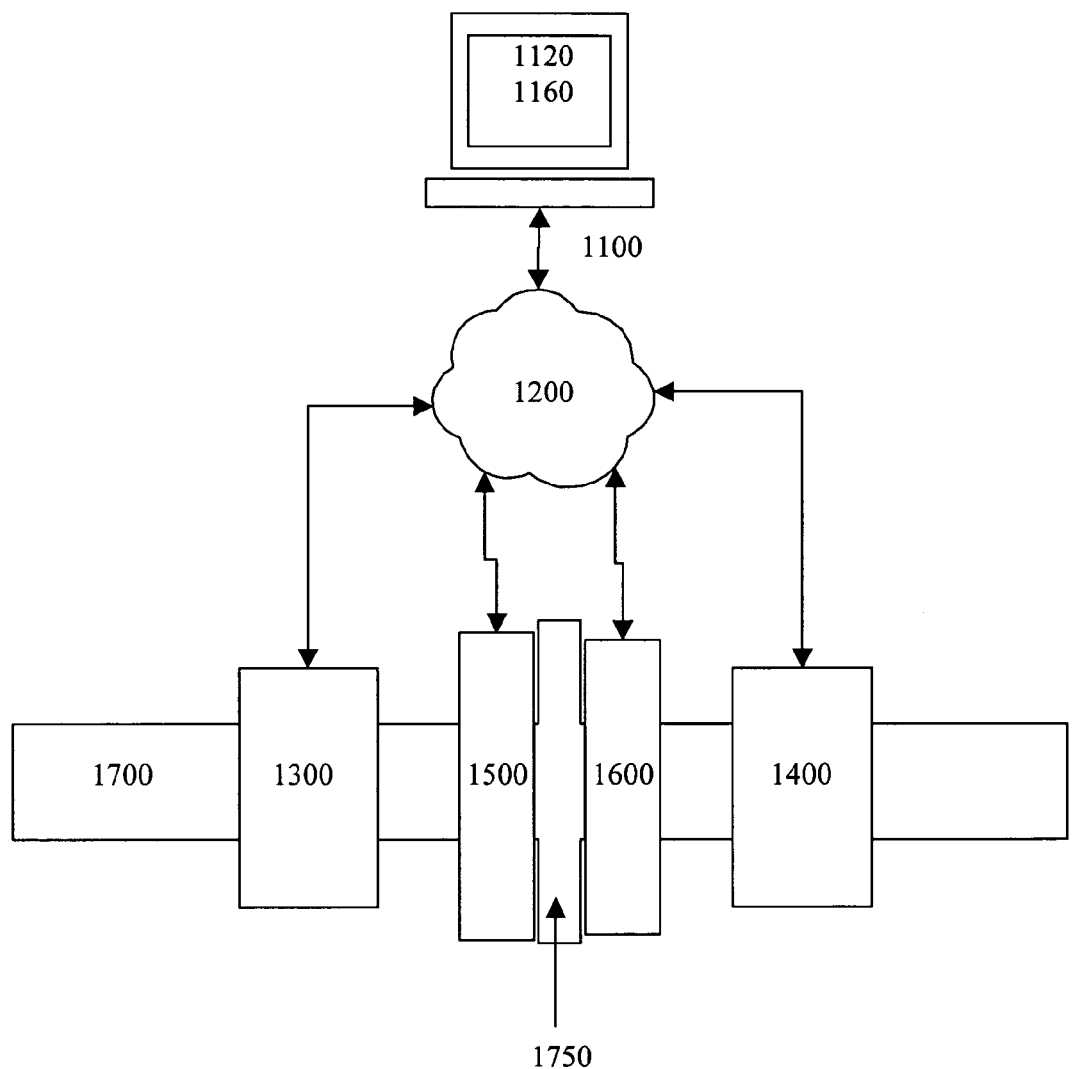
FIG. 1 is a block diagram of an exemplary embodiment of a system 1000.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- accept—receive.
- activity—an action, act, deed, function, step, and/or process and/or a portion thereof.
- adapted to—suitable, fit, and/or capable of performing a specified function.
- adapter—a device used to effect operative compatibility between different parts of one or more pieces of an apparatus or system.
- air—the earth's atmospheric gas.
- amplifier—a device that increases strength of signals passing through it.
- and/or—either in conjunction with or in alternative to.
- annular—shaped like a ring.
- apparatus—an appliance or device for a particular purpose.
- applied—incident directly and/or indirectly upon.
- approximately—about and/or nearly the same as.
- associated—related to and/or accompanying.
- automatically—acting and/or operating in a manner essentially independent of external human influence and/or control. For example, an automatic light switch can turn on upon "seeing" a person in its view, without the person manually operating the light switch.
- axial—located on, around, or in the direction of an axis.
- between—in a separating interval and/or intermediate to.
- can—is capable of, in at least some embodiments.
- cause—to bring about, provoke, precipitate, produce, elicit, be the reason for, result in, and/or effect.
- circuit board—a thin substantially planar board to which electronic components and/or sockets therefor are mounted, coupled, and/or interconnected, typically by solder. Component leads and integrated circuit pins may pass through holes ("vias") in the board or they may be surface mounted, in which case no holes are required (although they may still be used to interconnect different layers of the board).
- communicate—to exchange information.
- communications port—a connector for a communications interface.
- communicatively—linking in a manner that facilitates communications.
- component—a constituent element and/or part.
- comprise—to include but be not limited to, what follows.
- configure—to design, arrange, set up, shape, and/or make suitable and/or fit for a specific purpose.
- connect—physically or logically join, link, couple, and/or fasten two or more entities.
- connection—a physical and/or logical link and/or channel between two or more points in a system. For example, a wire, an optical fiber, a wireless link, and/or a virtual circuit, etc.
- control—(n) a mechanical or electronic device used to operate a machine within predetermined limits; (v) to exercise authoritative and/or dominating influence over, cause to act in a predetermined manner, direct, adjust to a requirement, and/or regulate.
- convert—to transform, adapt, and/or change, such as from a first form to a second form.
- corresponding—related, associated, accompanying, similar in purpose and/or position, conforming in every respect, and/or equivalent and/or agreeing in amount, quantity, magnitude, quality, and/or degree.
- couple—to join, connect, and/or link two things together.
- create—to make, form, produce, generate, bring into being, and/or cause to exist.
- data—information represented in a form suitable for processing by an information device.
- data structure—an organization of a collection of data that allows the data to be manipulated effectively and/or a logical relationship among data elements that is designed to support specific data manipulation functions. A data structure can comprise metadata to describe the properties of the data structure. Examples of data structures can include: array, dictionary, graph, hash, heap, linked list, matrix, object, queue, ring, stack, tree, and/or vector.
- define—to establish the meaning, relationship, outline, form, and/or structure of, and/or to precisely and/or distinctly describe and/or specify.
- degree—a unit of angular measure equal in magnitude to $1/360$ of a complete revolution in a predetermined plane.
- detect—to sense, perceive, identify, discover, ascertain, respond to, and/or receive the existence, presence, and/or fact of.
- determine—to obtain, calculate, decide, deduce, establish, and/or ascertain.
- device—an instrumentality adapted to a particular purpose.

disposed—placed, arranged, and/or oriented.

each—every one of a group considered individually.

electrical—relating to producing, distributing, and/or operating by electricity.

electrical energy—energy characterized by the flow of electric charge through a conductor.

electrically—of, relating to, producing, or operated by electricity.

electromagnet—a core of magnetic material adapted to be surrounded by a coil of wire through which an electric current is passed to magnetize the core.

estimate—to calculate and/or determine approximately and/or tentatively.

first—being before all others in an exemplary ordering.

flow—a continuous transfer.

from—used to indicate a source.

further—in addition.

gap—a space between objects.

generate—to create, produce, render, give rise to, and/or bring into existence.

greater—larger and/or more than.

half—approximately fifty percent.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

heat—energy associated with the motion of atoms and/or molecules and capable of being transmitted through solid media and fluid media by conduction, through fluid media by convection, and through fluid media and/or empty space by radiation.

hub—a central part of a magnetic bearing adapted to be coupled to a machine rotor.

inch—a unit of length equal to one twelfth of a foot.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

journal—portion of a shaft adapted to receive a mountable bearing.

junction box—an enclosure that houses electric wires or cables.

lamination—a thin metallic sheet adapted to increase a resistance of a rotating portion of a magnetic bearing.

less than—having a measurably smaller magnitude and/or degree as compared to something else.

located—situated in a particular spot and/or position.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine, such as an information device, computer, microprocessor, and/or controller, etc., can obtain and/or store data, information, and/or instructions. Examples include memories, punch cards, and/or optically-readable forms, etc.

magnetic—having the property of attracting iron and certain other materials by virtue of a surrounding field of force.

magnetic bearing—a bearing that supports a load using magnetic levitation.

majority—more than half of a total.

may—is allowed and/or permitted to, in at least some embodiments.

memory device—an apparatus capable of storing analog or digital information, such as instructions and/or data. Examples include a nonvolatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modular—comprising sections that are substantially non-destructively separable.

more—greater.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, CAN, Modbus, serial protocol, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

no—not any.

offset—one object set off from something else.

packet—a generic term for a bundle of data organized in a specific way for transmission, such as within and/or across a network, such as a digital packet-switching network, and comprising the data to be transmitted and certain control information, such as a destination address.

pair—a quantity of two of something.

percent—one part in one hundred.

plate—a flat rigid body.

plurality—the state of being plural and/or more than one.

portion—a part, component, section, percentage, ratio, and/or quantity that is less than a larger whole. Can be visually, physically, and/or virtually distinguishable and/or non-distinguishable.

position—(n) a place and/or location, often relative to a reference point. (v) to place and/or locate.

power—energy, a measure of energy and/or work, and/or a rate at which work is done, expressed as the amount of work per unit time and commonly measured in units such as watt and horsepower.

predetermined—established in advance.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

project—to calculate, estimate, or predict.

provide—to furnish, supply, give, convey, send, and/or make available.

pulse width modulated—encoded via pulse width modulation.

radial—relating to a bearing adapted to restrain displacement substantially radial to a center of rotation and/or perpendicular to an axis of rotation.

radially—in a manner that radiates from and/or converges to a common center.

receive—to gather, take, acquire, obtain, accept, get, and/or have bestowed upon.

recommend—to suggest, praise, commend, and/or endorse.

regarding—pertaining to.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

repeatedly—again and again; repetitively.

request—(v.) to express a need and/or desire for; to inquire and/or ask for. (n.) that which communicates an expression of desire and/or that which is asked for.

ring—a substantially toroidal object that can be imagined as having been generated by rotating a closed loop (e.g., ellipse, circle, irregular curve, polygon, etc.) about a fixed line external to the loop.

rotating—turning about an axis.

rotor—a rotating portion of a machine.

said—when used in a system or device claim, an article indicating a subsequent claim term that has been previously introduced.

second—being immediately after a first item in an exemplary ordering.

sector—a portion of a circular object bounded by two radii and an included arc.

select—to make and/or indicate a choice and/or selection from among alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electromagnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

separate—(n) distinct; (v) to disunite, space, set, or keep apart and/or to be positioned intermediate to.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

signaling—sending a message to.

source—an original and/or intermediate transmitter of traffic and/or a related group of such transmitters and/or a point at which something originates, springs into being, and/or from which it derives and/or is obtained.

static—stationary and/or constant relative to a rotating component.

stator—a stationary part in or about which another part (the rotor) revolves.

store—to place, hold, retain, enter, and/or copy into and/or onto a machine-readable medium.

substantially—to a considerable, large, and/or great, but not necessarily whole and/or entire, extent and/or degree.

support—to bear the weight of, especially from below.

system—a collection of mechanisms, devices, data, and/or instructions, the collection designed to perform one or more specific functions.

target—a destination.

three—a cardinal number equal to one plus one plus one.

thrust—relating to a bearing adapted to restrain displacement substantially parallel to an axis of rotation.

touchdown—relating to a surface of a magnetic bearing assembly, the surface adapted to separate a static portion of the magnetic bearing assembly from a portion of the magnetic bearing assembly that is adapted to rotate when magnetic fields of the magnetic bearing assembly are insufficient for rotor levitation.

transfer—(n) a transmission from one device, place, and/or state to another. (v) to convey from one device, place, and/or state to another.

transmit—to provide, furnish, supply, send as a signal, and/or to convey (e.g., force, energy, and/or information) from one place and/or thing to another.

two—a cardinal number equal to one plus one.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

volume—a disk drive and/or virtual disk drive.

wedge—an object comprising two substantially planar, substantially radial faces that are separated by an acute angle and are bounded by a substantially arcuate and/or planar face, and comprising an opposing pair of substantially parallel, substantially sector-shaped faces that are substantially perpendicular to the two substantially planar, substantially radial faces.

when—at a time.

wherein—in regard to which; and; and/or in addition to.

DETAILED DESCRIPTION

Certain exemplary embodiments comprise a system, which can comprise a radial magnetic bearing static portion. The radial magnetic bearing static portion can comprise a plurality of electromagnets. The radial magnetic bearing static portion can comprise a plurality of pulse width modulated amplifiers, each of which can be adapted to provide electrical energy to a corresponding electromagnet of the plurality of electromagnets.

Certain exemplary embodiments can comprise a relatively compact, high performance, low-cost magnetic bearing adapted for use in machinery with rotating shafts. In certain exemplary embodiments, electronics for the magnetic bearing, which can comprise sensor conditioning, digital processing, and/or power amplification, can be packaged within a stator structure of the magnetic bearing. The magnetic bearing can comprise touchdown surfaces adapted to support a shaft when the magnetic bearing is either powered down or failed.

Magnetic bearings can be used to support and position rotating machinery for applications in which one or more of the following specifications is present:

low mechanical wear;

no lubrication;

relatively high rotational speeds (e.g., between approximately 3,600 and approximately 100,000 rpm);

operation in harsh environments; and/or relatively low frictional losses.

Certain exemplary magnetic bearing systems can comprise electromagnets, sensors, and/or electronic controls. Electrical connections between the electronic controls and the electromagnets can carry electrical currents related to operation of the magnetic bearing. A radial bearing can be adapted to support a rotating shaft along lateral directions. The radial bearing can comprise three or more electromagnets and/or sensors. A thrust bearing can be adapted to restrain motion of the rotating shaft along a longitudinal (axial) direction. The thrust bearing can comprise two or more electromagnets and two or more sensors. A five-axis system can comprise two radial bearings and one or more thrust bearings, which collectively can comprise approximately ten electromagnets and/or approximately ten sensors.

Electrical energy for the magnetic bearing can be transferred from a source of electrical energy to amplifiers and/or electromagnets of the magnetic bearing. The amplifiers can be continuous-type amplifiers and/or switch-type amplifiers such as pulse-width modulated (PWM) amplifiers. Because each electromagnet in the magnetic bearing can behave as a large inductor in series with a small resistance, reactive power flowing to each electromagnet might be high, but actual net energy that flows to the magnetic bearings might be relatively small, even for relatively large current levels within in the magnetic bearing. Because a relatively small amount power might be dissipated in amplifiers and electromagnets, a current flowing between the source of electrical energy and the amplifier for each electromagnet can be a small fraction of a current flow in an exemplary electromagnet. In certain exemplary embodiments, an electrical current flow in an electromagnet can be approximately ten times higher than a current flow to an exemplary amplifier.

Because the current flowing between the amplifiers and electromagnets can be greater than the current between the amplifiers and electromagnets, certain exemplary embodiments can keep amplifiers and electromagnets in relatively close proximity. In certain exemplary embodiments, the magnetic bearing can comprise electronic controls. Amplifiers can be located in relatively close proximity to electromagnets.

In certain exemplary embodiments, leads between the amplifiers and the electromagnets can be relatively short and within the magnetic bearing so an amount of EMI produced is relatively low.

FIG. 1 is a block diagram of an exemplary embodiment of a system 1000, which can comprise a shaft 1700. A displacement of shaft 1700 can be radially restrained via a first magnetic bearing 1300 and/or a second magnetic bearing 1400. Each of first magnetic bearing 1300 and/or second magnetic bearing 1400 can comprise a rotating portion and a static portion. Shaft 1700 can comprise a disk portion 1750. An axial displacement of shaft 1700 can be restrained via first thrust magnetic bearing 1500 and/or second thrust magnetic bearing 1600 acting upon disk portion 1750.

Each of first magnetic bearing 1300, second magnetic bearing 1400, first thrust magnetic bearing 1500, and/or second thrust magnetic bearing 1600 can be externally monitored and/or controlled via a control program 1160 executing on an information device 1100. Signals to each of first magnetic bearing 1300, second magnetic bearing 1400, first thrust magnetic bearing 1500, and/or second thrust magnetic bearing 1600 can be transmitted via a network 1200. Information device 1100 can comprise a user interface 1120, which can be adapted to render information related to shaft 1700, first magnetic bearing 1300, second magnetic bearing 1400, first thrust magnetic bearing 1500, and/or second thrust magnetic bearing 1600.

Figure 2:
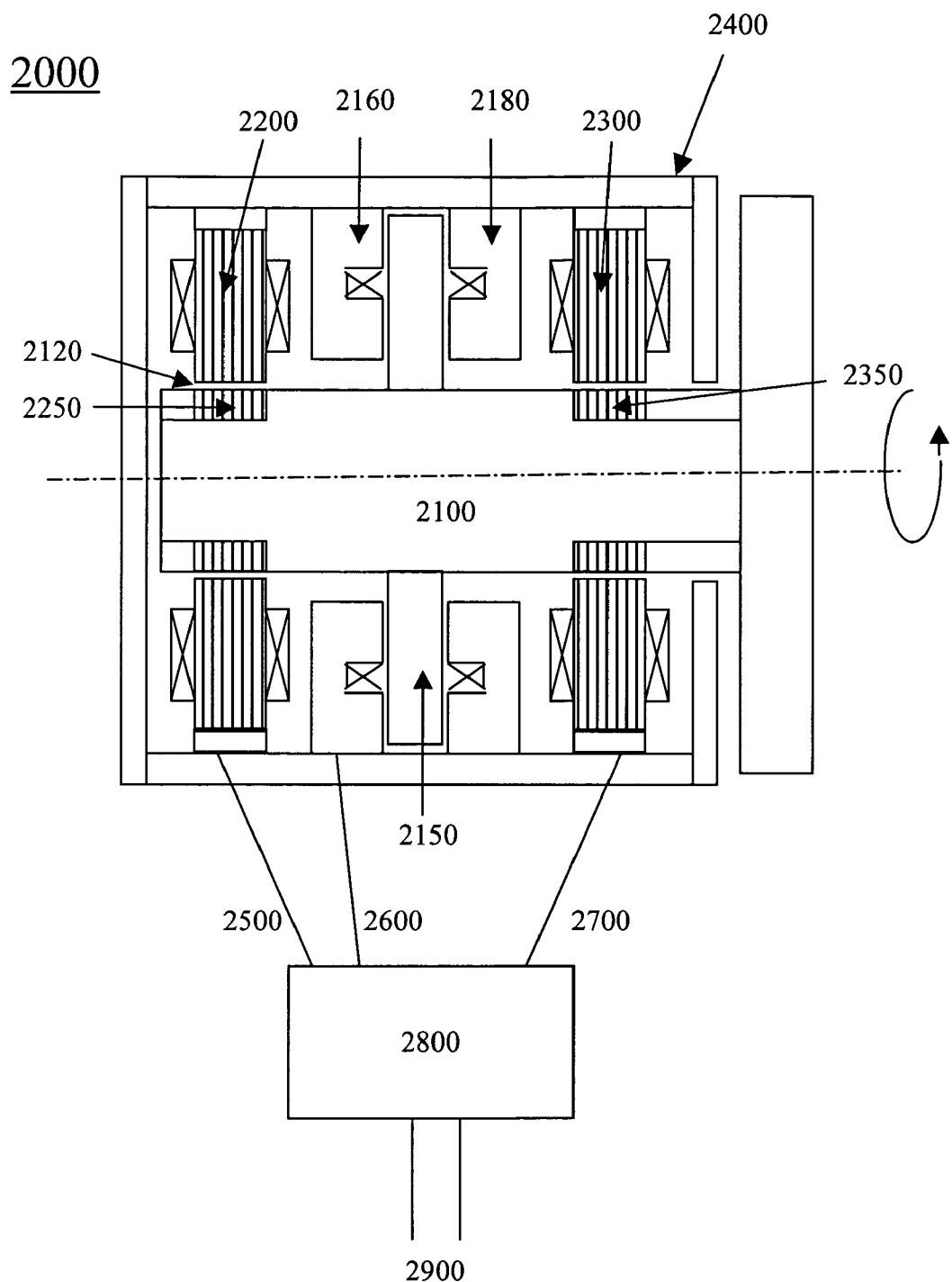
FIG. 2 is a block diagram of an exemplary embodiment of a system 2000.

FIG. 2 is a block diagram of an exemplary embodiment of a system 2000, which can comprise a junction box 2800, which can be adapted to electrically couple a first radial magnetic bearing static portion 2200 to an energy source 2900. Energy source 2900 can be a direct current (DC) energy source adapted to provide electrical energy via a positive lead and negative lead. System 2000 can comprise a shaft 2100. Shaft 2100 can be supported and/or restrained in motion relative to a static structure 2400 via first radial magnetic bearing static portion 2200, second radial magnetic bearing static portion 2300, first thrust magnetic bearing static portion 2160 and/or second thrust magnetic bearing static portion 2180. First magnetic bearing static portion 2200 can be associated with a corresponding first magnetic bearing rotating portion 2250. Likewise, second magnetic bearing static portion 2300 can be associated with a corresponding second magnetic bearing rotating portion 2350. Electrical energy can be provided to first radial magnetic bearing static portion 2200 via a first pair of electrical conductors 2500. Electrical energy can be provided to first thrust magnetic bearing static portion 2160 and/or second thrust magnetic bearing static portion 2180 via a second pair of electrical conductors 2600. Similarly, electrical energy can be provided to second radial magnetic bearing static portion 2300 via a third pair of electrical conductors 2700.

First thrust magnetic bearing static portion 2160 and/or second thrust magnetic bearing static portion 2180 can be adapted to restrain shaft 2100 via a disk portion 2150. First thrust magnetic bearing static portion 2160 and/or second thrust magnetic bearing static portion 2180 can comprise two or more electromagnets.

In certain exemplary embodiments, an air gap 2120 between first magnetic bearing rotating portion 2250 and first magnetic bearing static portion 2200 can be less, in inches, than approximately 0.001, 0.003, 0.006, 0.010, 0.011, 0.014, 0.019, 0.020, 0.03, 0.034, 0.037, and/or 0.040, and/or any value or subrange therebetween.

Certain exemplary embodiments can comprise one or more of the following:

- an electronic control, which can be adapted for sensing, processing, and/or amplification. The electronic control can be packaged within a stator structure of a magnetic bearing static portion, such as first magnetic bearing static portion 2200;
- communications with one or more of magnetic bearing static portions, such as first magnetic bearing static portion 2200, second radial magnetic bearing static portion 2300, first thrust magnetic bearing static portion 2160 and/or second thrust magnetic bearing static portion 2180 without the need for an external electronic controller;
- first radial magnetic bearing static portion 2200, second radial magnetic bearing static portion 2300, first thrust magnetic bearing static portion 2160 and/or second thrust magnetic bearing static portion 2180 can be associated with one or more circuit boards of an annular shape (such as first annular circuit board 5300 and second annular circuit board 5900 of FIG. 5) that can be packaged on either side of electromagnets;
- first radial magnetic bearing static portion 2200, second radial magnetic bearing static portion 2300, first thrust magnetic bearing static portion 2160 and/or second thrust magnetic bearing static portion 2180 can comprise independent electromagnets shaped in an E shape (such as illustrated by electromagnet 5700 of FIG. 5) with one coil per electromagnet and no back iron;
- first radial magnetic bearing static portion 2200, second radial magnetic bearing static portion 2300, first thrust magnetic bearing static portion 2160 and/or second thrust magnetic bearing static portion 2180 can comprise electronic circuit boards and wiring in wedge-shaped volumes (such as wedge volumes 5600 of FIG. 5) between electromagnets (such as electromagnet 5700 of FIG. 5);
- first radial magnetic bearing static portion 2200, second radial magnetic bearing static portion 2300, first thrust magnetic bearing static portion 2160 and/or second thrust magnetic bearing static portion 2180 can comprise relatively small sensors (such as sensors 5500 of FIG. 5) positioned on both sides of electromagnets (such as electromagnet 5700 of FIG. 5);
- first radial magnetic bearing static portion 2200, second radial magnetic bearing static portion 2300, first thrust magnetic bearing static portion 2160 and/or second thrust magnetic bearing static portion 2180 can comprise sensors between electromagnets (such as electromagnet 5700 of FIG. 5) at angular positions offset from centers of electromagnets so that the sensors (such as sensors 5500 of FIG. 5) can be packaged between end winding (such as coil 5780 of FIG. 5) of the electromagnets; and/or
- touchdown surfaces (such as touchdown first touchdown ring 5100 and/or second touchdown ring 5950 of FIG. 5) on either side of first radial magnetic bearing static portion 2200 and/or second radial magnetic bearing static portion 2300.

Figure 3:
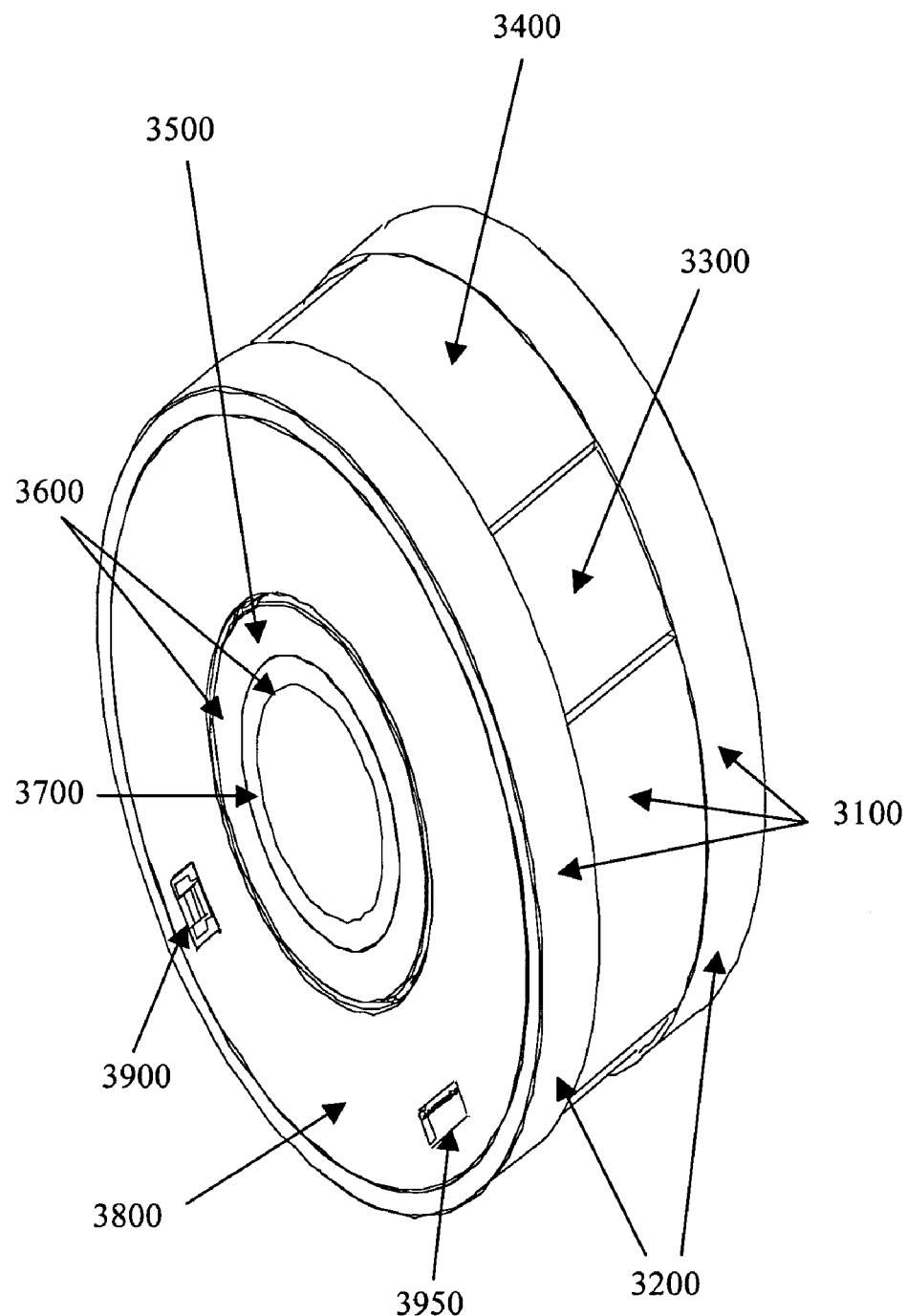
FIG. 3 is a perspective view of an exemplary embodiment of a magnetic bearing system 3000.

FIG. 3 is a perspective view of an exemplary embodiment of a magnetic bearing system 3000, which illustrates an exemplary radial magnetic bearing static portion 3100 and a radial magnetic rotating portion 3600 when both are assembled. Radial magnetic rotating portion 3600 can be mounted on the outside diameter of a rotating shaft of a machine and rotates with the shaft. Radial magnetic bearing static portion 3100, which can comprise electromagnets and electronics, can substantially surround radial magnetic rotating portion 3600. An inner diameter of radial magnetic bearing static portion 3100 can be slightly larger than an outside diameter of radial magnetic rotating portion 3600 so that a radial air gap exists between radial magnetic rotating portion 3600 and radial magnetic bearing static portion 3100. In certain exemplary embodiments, radial magnetic bearing static portion 3100 can actively position radial magnetic rotating portion 3600 such that radial magnetic rotating portion 3600 remains substantially concentric to radial magnetic bearing static portion 3100, thereby substantially eliminating mechanical contact.

Radial magnetic bearing static portion 3100 can comprise:
- one or more support plates 3200;
- a plurality of wedge volumes 3300;
- a plurality of stator lamination stacks 3400; and/or
- a touchdown ring 3800.

Radial magnetic bearing rotating portion 3600 can comprise:
- a hub 3700;
- a plurality of laminations;
- a sensor target ring; and/or
- a touchdown journal 3500.

Electronics for system 3000 can be packaged in radial magnetic bearing static portion 3100. System 3000 can comprise an electrical connection 3950, which can be adapted to receive electrical energy from an electrical energy source.

System 3000 can comprise a communications port 3900, which can be communicatively coupled to a network.

Figure 4:
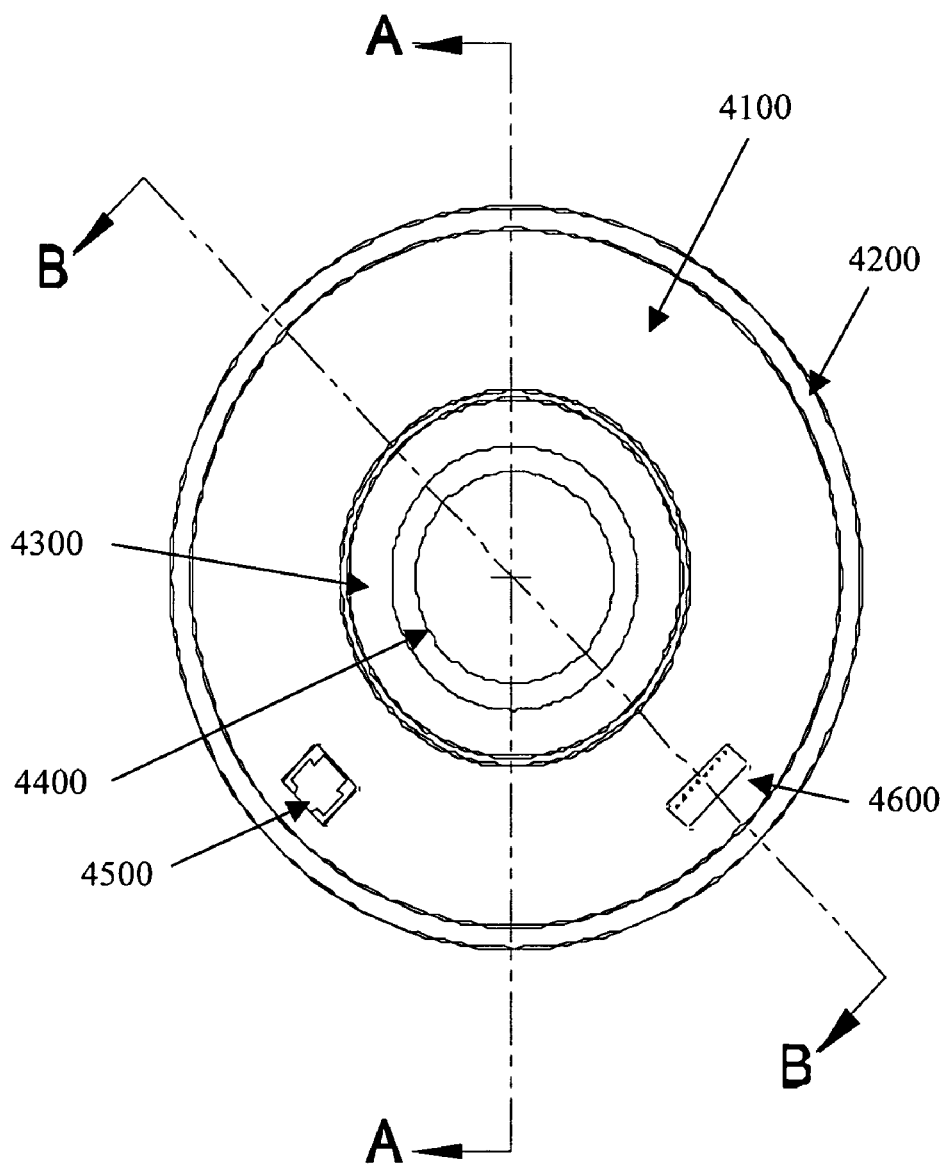
FIG. 4 is an end view of an exemplary embodiment of a magnetic bearing system 4000.

FIG. 4 is an end view of an exemplary embodiment of a magnetic bearing system 4000, which can comprise:
- a touchdown ring 4100;
- one or more support plates 4200;
- a touchdown journal 4300;
- a hub 4400;
- an electrical connection 4600, which can be adapted to receive electrical energy from an electrical energy source; and/or
- a communications port 4500, which can be communicatively coupled to a network.

Figure 5:
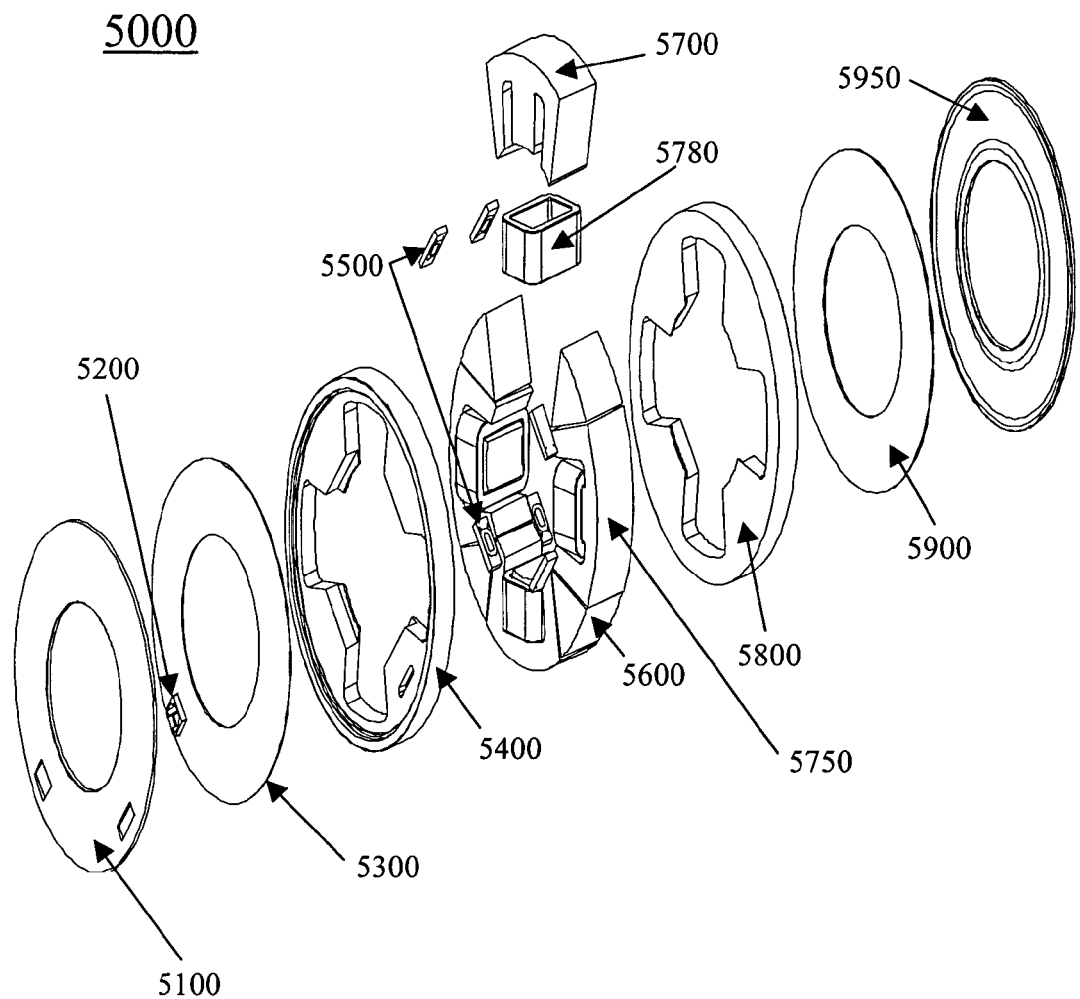
FIG. 5 is an exploded view of an exemplary embodiment of a magnetic bearing static portion 5000.

FIG. 5 is an exploded view of an exemplary embodiment of a magnetic bearing static portion 5000, which can comprise a plurality of electromagnets 5700, such as three or more electromagnets 5700. Each electromagnet 5700 can be comprised by an electromagnet sector 5750. Each electromagnet 5700 can comprise a coil 5780. Magnetic bearing static portion 5000 can comprise a first support plate 5400 and/or a second support plate 5800, each of which can be adapted to support and/or restrain motion of electromagnet sectors 5750, a plurality of wedge volumes 5600, and/or a plurality of position sensors 5500. Magnetic bearing static portion 5000 can comprise a plurality of pulse width modulated amplifiers, such as three or more pulse width modulated amplifiers, housed within a respective corresponding wedge volume of plurality of wedge volumes 5600. Each pulse width modulated amplifiers can be adapted to provide electrical energy to a corresponding electromagnet of plurality of electromagnets 5700. Each of the plurality of wedge volumes 5600 can be radially disposed between a corresponding pair of plurality of electromagnets 5700. One or more of the plurality of wedge volumes 5600 can be adapted to pass electrical signals from plurality of position sensors 5500 to at least one of a first annular circuit board 5300 and a second annular circuit board 5900.

In the exemplary embodiment illustrate, there are four electromagnets, each consisting of a stack of bonded E-laminations with a coil wound around the center leg of an "E" shaped electromagnet.

In certain exemplary embodiments, each of plurality of electromagnets 5700 is individually secured between first support plate 5400 and second support plate 5800 without a continuous back iron between plurality of electromagnets 5700.

Each electromagnet 5700 can be comprised by a modular electromagnet sector 5750. Each electromagnet 5700 can be associated with a corresponding pulse width modulated amplifier. Each pulse width modulated amplifier can be adapted to provide electrical energy to a corresponding electromagnet 5700. A corresponding wedge volume 5600 can comprise each of the pulse width modulated amplifiers. Each wedge volume 5600 can be radially disposed between a corresponding pair of the electromagnets 5700.

Support plate 5400 can be adapted to transfer greater than fifty percent of heat provided from an axial face of magnetic bearing static portion 5000. The axial face of magnetic bearing static portion 5000 can be at least partially defined by touchdown ring 5100. The heat can be generated by components such as:
  electromagnets 5700;
  first annular circuit board 5300;
  second annular circuit board 5900; and/or
  the pulse width modulated amplifiers comprised by and/or contained in wedge volumes 5600, etc.

First annular circuit board 5300 can be adapted to accept a communicative connection from a network at communication connector 5200. Second annular circuit board 5900 can be adapted to provide electrical energy, communicative signaling, and/or control signaling to the plurality pulse width modulated amplifiers. First annular circuit board 5300 can be electrically coupled and/or communicatively coupled to second annular circuit board 5900.

Plurality of position sensors 5500 can be adapted to detect a radial position of a magnetic bearing rotating portion corresponding to magnetic bearing static portion 5000. Each of plurality of position sensors 5500 can be located between a corresponding pair of plurality of electromagnets 5700. As such, each of plurality of position sensors 5500 fits between a corresponding pair of coils of plurality of electromagnets 5700. By averaging the signals from sensors that are located on each side of a magnet, and by subtracting signals from sensors across a diameter, an influence of rotor growth (due to thermal and centrifugal forces) and an influence of angular pitch of the rotor may both be compensated for and/or eliminated from the sensed signal. Averaging the signals can improve a relative ability to detect an actual position of a center of a rotor relative to a center of a stator, which in turn improves a stability of a closed-loop control of magnetic bearing static portion 5000. In certain exemplary embodiments, plurality of sensors 5500 can comprise eight sensors, which can each be offset by approximately 45 degrees.

Magnetic bearing static portion 5000 can comprise a first touchdown ring 5100 and/or a second touchdown ring 5950, each of which can be adapted to separate static portion 5000 from the corresponding magnetic bearing rotating portion when no electrical energy is applied to the radial magnetic bearing. A radial gap between the inner diameter of first touchdown ring 5100 and/or second touchdown ring 5950 and corresponding touchdown journals comprised by a rotating portion of the magnetic bearing can be approximately one-half of a radial gap between plurality of electromagnets 5700 and the rotating portion of the magnetic bearing. Accordingly, when the magnetic bearing is not operating, either because of a lack of electrical energy or because of a failure, the rotating portion of the magnetic bearing can be supported at an inner diameter of first touchdown ring 5100 and/or second touchdown ring 5950 without contact between the magnetic iron in magnetic bearing static portion 5000 and the rotating portion of the magnetic bearing. This reduces potential damage to the magnetic bearing and/or an associated machine when the magnetic bearing is not operating. Because touchdown surfaces are included on both ends of magnetic bearing static portion 5000, the magnetic iron is protected from contact along an entire length of an associated lamination stack.

Figure 6:
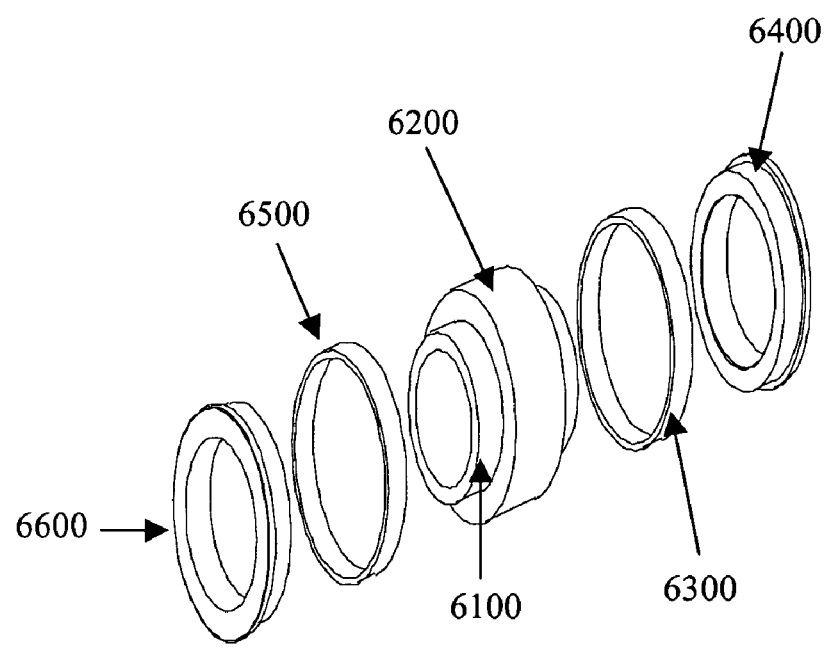
FIG. 6 is an exploded view of an exemplary embodiment of a magnetic bearing rotating portion 6000.

FIG. 6 is an exploded view of an exemplary embodiment of a magnetic bearing rotating portion 6000, which can comprise a series of components mounted on an outer diameter of a hollow hub 6100. Hub 6100 can be mounted on a shaft of a machine (not illustrated). A stack of rotor laminations 6200 can be mounted in a central region of hub 6100. Rotor laminations 6200 can be adapted to complete a magnetic flux path of electromagnets comprised by a magnetic bearing static portion, thereby producing a radial force associated with the magnetic bearing. On either side of rotor laminations 6200 are first sensor target ring 6300 and second sensor target ring 6500, which can be surfaces detected by a plurality of sensors comprised by the magnetic bearing static portion. Magnetic bearing rotating portion 6000 can comprise a first touchdown journal 6400 and/or a second touchdown journal 6600, which can be adapted to contact a inner diameter of a corresponding pair of touchdown rings when the magnetic bearing is not energized.

Figure 7:
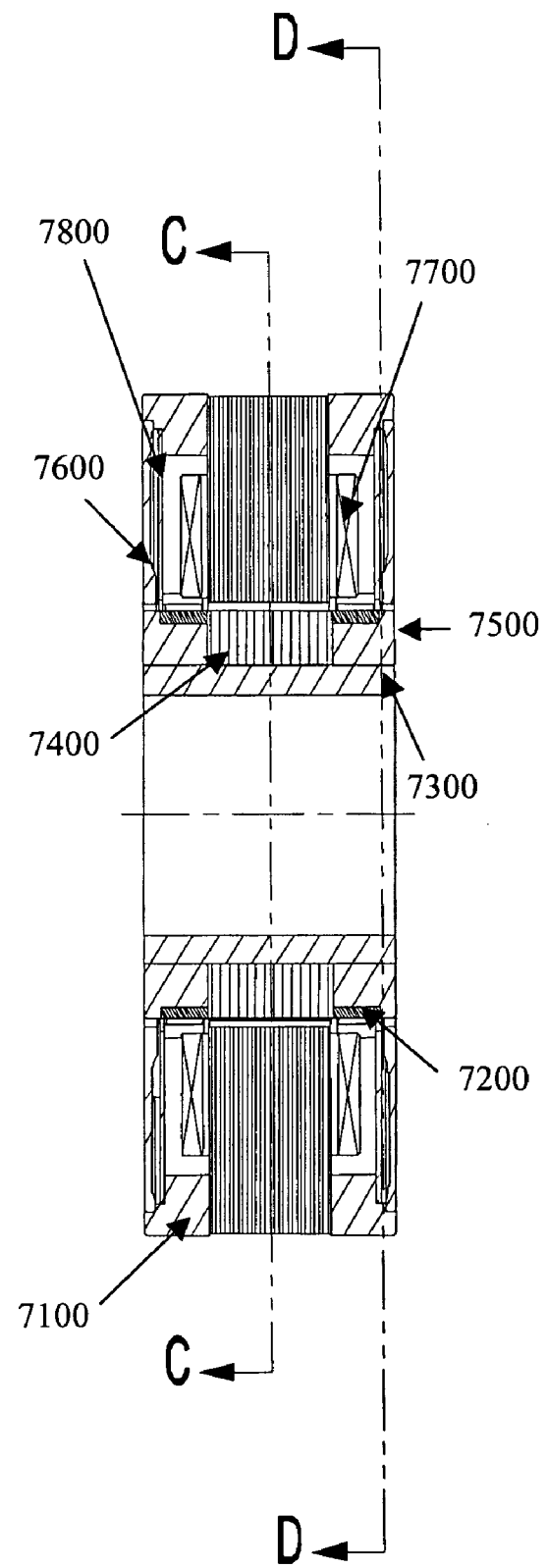
FIG. 7 is an exemplary embodiment of a system 7000 illustrating section A-A of FIG. 4.

FIG. 7 is an exemplary embodiment of a system 7000 illustrating section A-A of FIG. 4, which is a sectional view of a cut made through a central region of electromagnets. System 7000 can comprise:
  support plate 7100;
  sensor target 7200;
  hub 7300;
  rotor laminations 7400;
  touchdown journal 7500;
  touchdown ring 7600;
  coil 7700; and/or
  annular circuit board 7800, etc.

Figure 8:
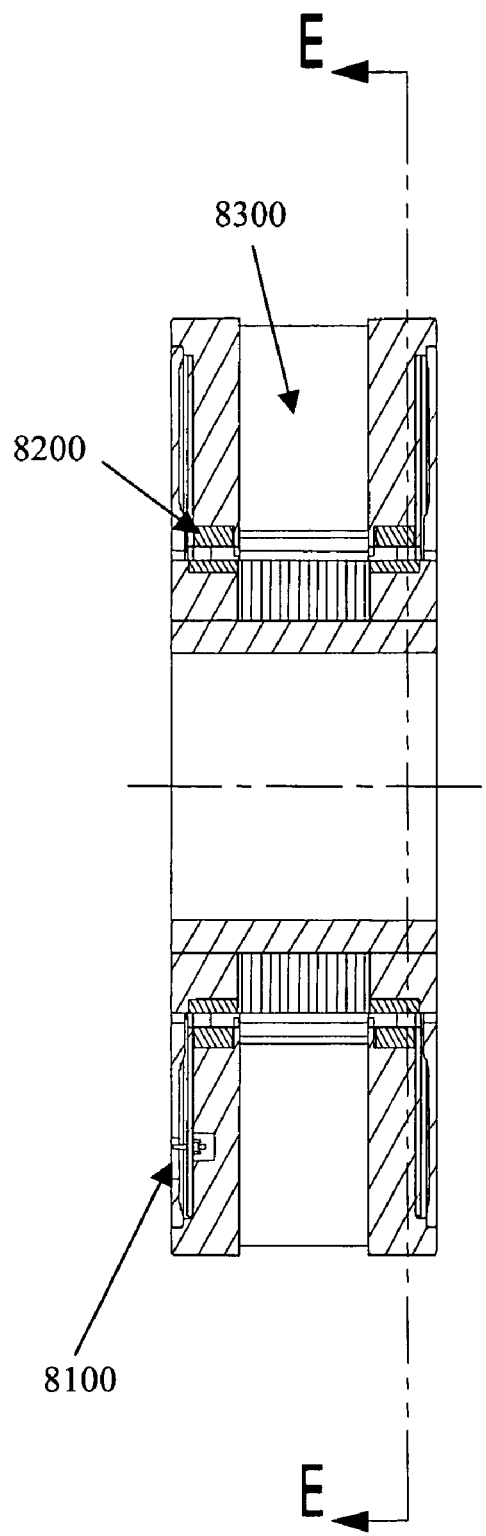
FIG. 8 is an exemplary embodiment of a system 8000 illustrating section B-B of FIG. 4.

FIG. 8 is an exemplary embodiment of a system 8000 illustrating section B-B of FIG. 4, which can be a sectional view of a cut made through a region comprising sensors of an exemplary embodiment. System 8000 can comprise:
  power connector 8100;
  sensor 8200; and/or
  wedge volume 8300, etc.

Figure 9:
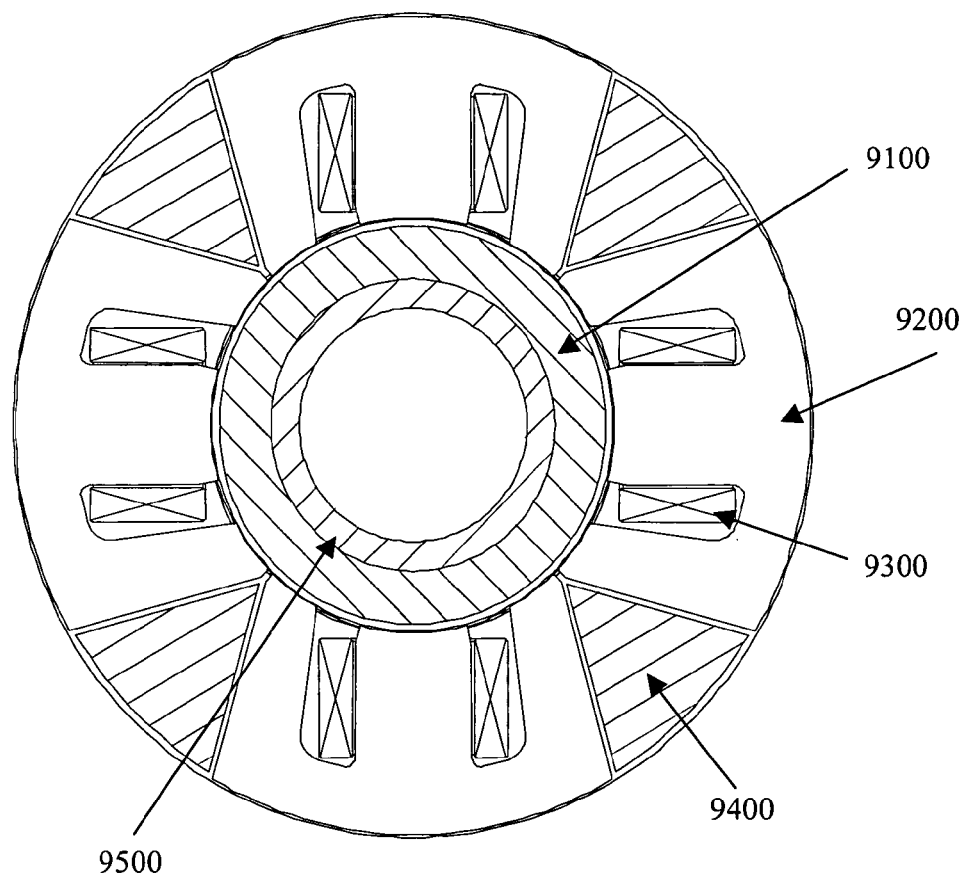
FIG. 9 is an exemplary embodiment of a system 9000 illustrating section C-C of FIG. 7.

FIG. 9 is an exemplary embodiment of a system 9000 illustrating section C-C of FIG. 7, which can be a cross section at the axial plane of the electromagnets. System 9000 can comprise:
  rotor laminations 9100;
  electromagnet 9200;
  coil 9300;
  wedge volume 9400; and/or
  hub 9500, etc.

Figure 10:
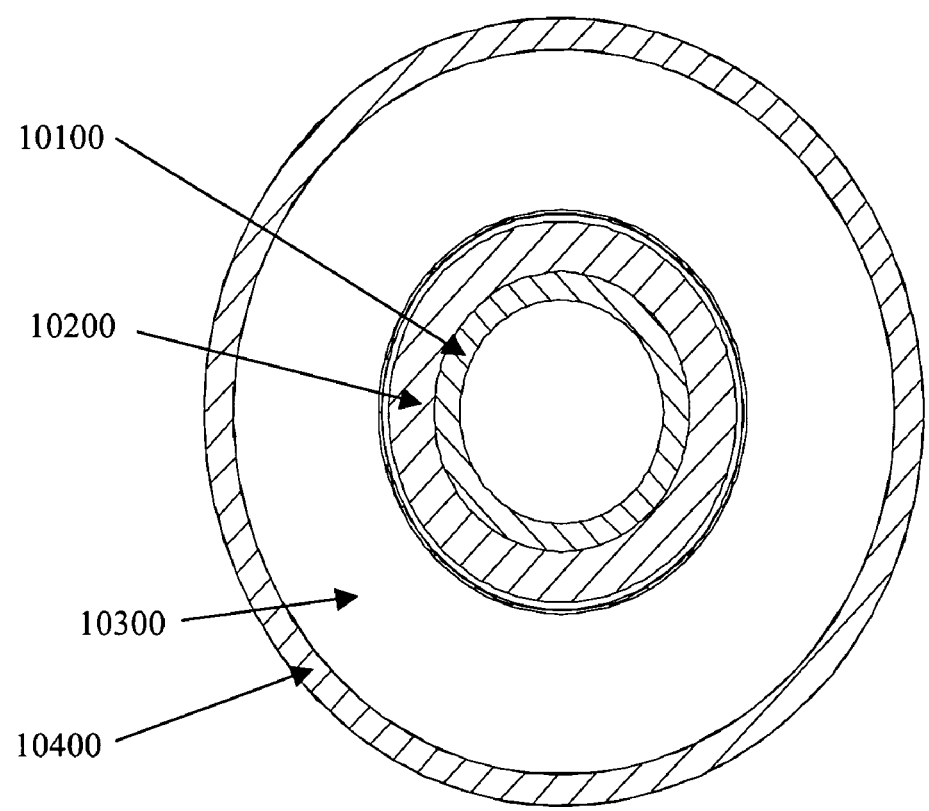
FIG. 10 is an exemplary embodiment of a system 10000 illustrating section D-D of FIG. 7.

FIG. 10 is an exemplary embodiment of a system 10000 illustrating section D-D of FIG. 7, which is a cross section at an axial plane of position sensors. System 10000 can comprise:

a hub 10100;
a touchdown journal 10200;
a touchdown ring 10300; and/or
a support plate 10400, etc.

Figure 11:
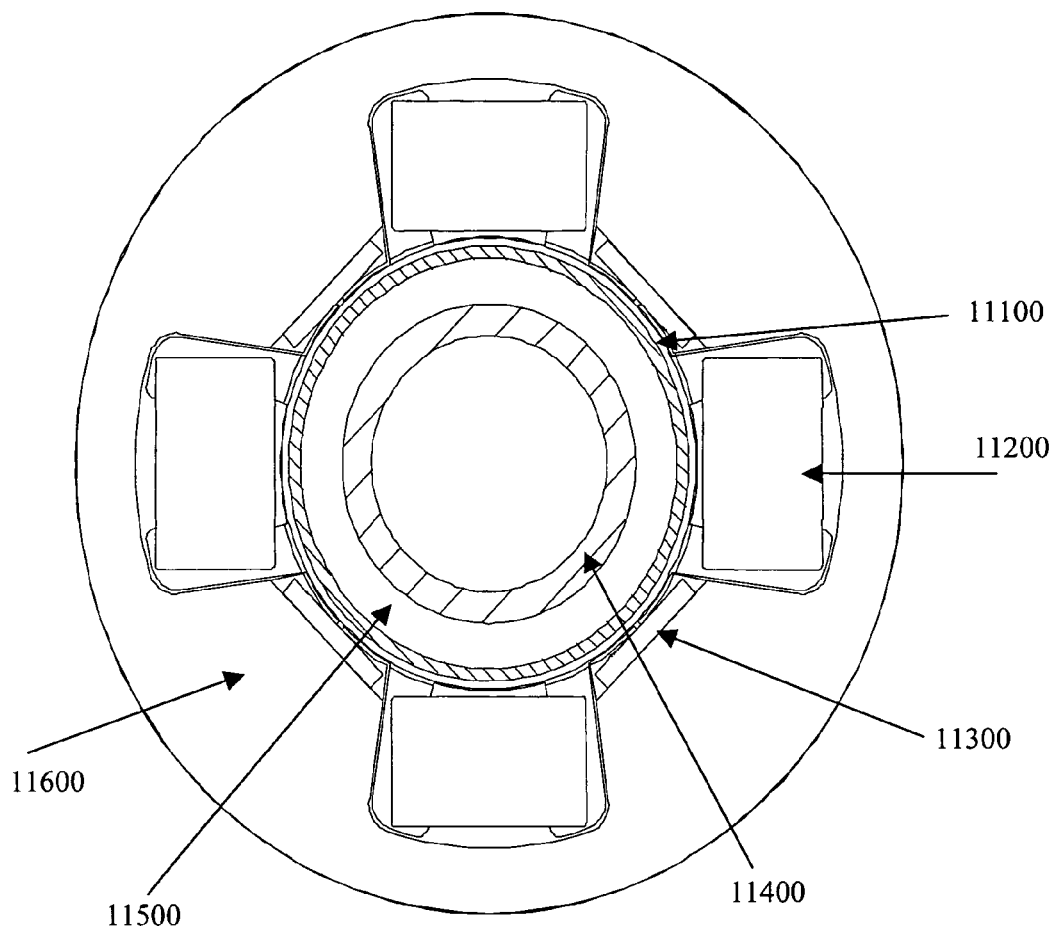
FIG. 11 is an exemplary embodiment of a system 11000 illustrating section E-E of FIG. 8.

FIG. 11 is an exemplary embodiment of a system 11000 illustrating section E-E of FIG. 8, which is a cross section at an axial plane of touchdown surfaces. FIG. 11 illustrates an exemplary embodiment of a sensor fitting between end windings of electromagnets. System 11000 can comprise:
a sensor target ring 11100;
a coil 11200;
a sensor 11300;
a hub 11400;
a touchdown journal 11500; and/or
a support plate 11600, etc.

Figure 12:
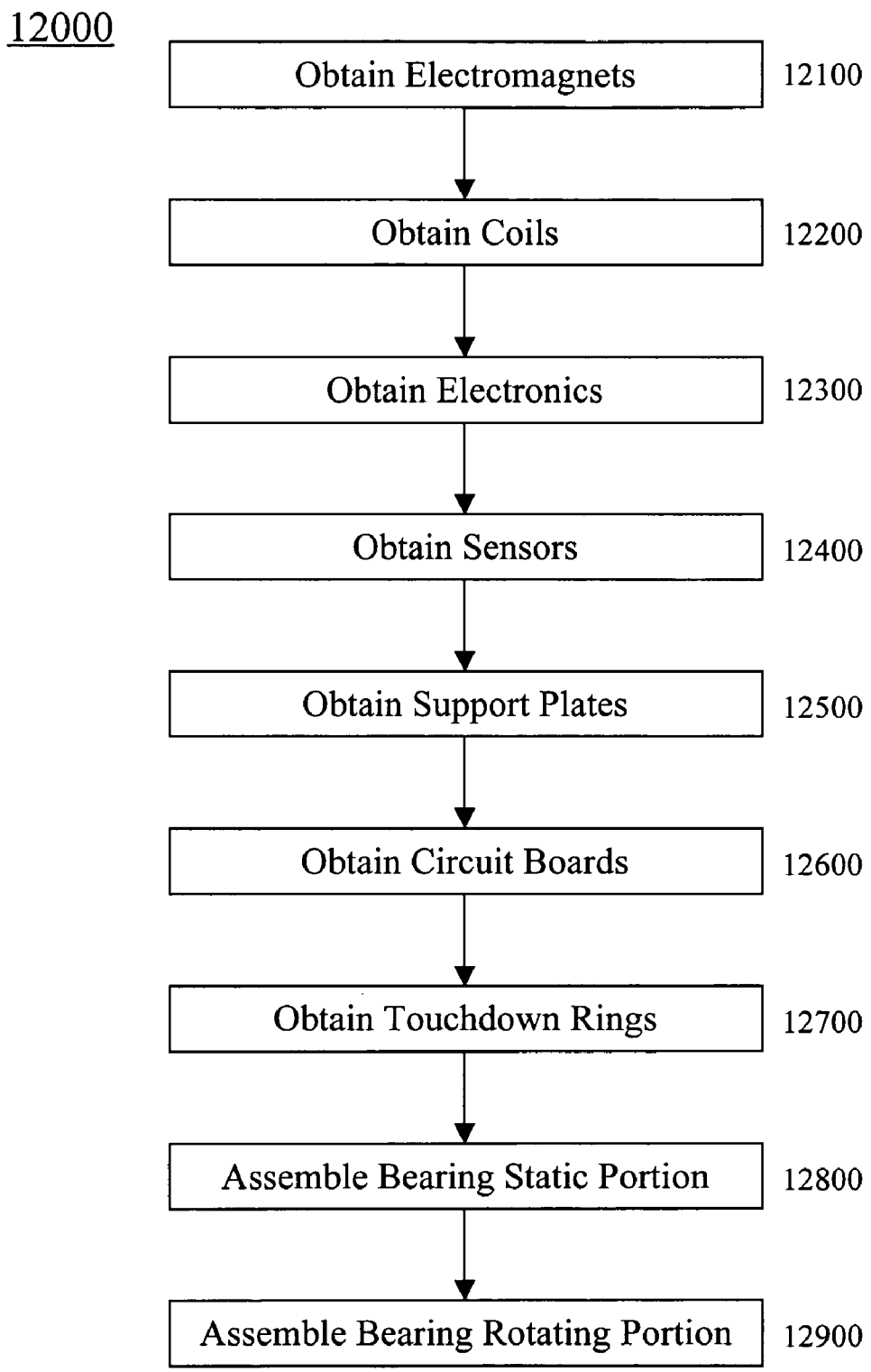
FIG. 12 is a flowchart of an exemplary embodiment of a method 12000.

FIG. 12 is a flowchart of an exemplary embodiment of a method 12000. At activity 12100, electromagnets can be obtained. For example, an E-shaped electromagnet, such as electromagnet 5700 of FIG. 5 can be obtained.

At activity 12200, coils can be obtained, which can be adapted for placement on the electromagnets. For example, a coil, such as coil 5780 of FIG. 5 can be obtained.

At activity 12300, electronics can be obtained. For example, a plurality of electronic circuits adapted to provide pulse width modulated signals to the electromagnets can be obtained. The electronic circuits can be adapted for installation and/or placement in one or more wedge volumes of a static portion of a magnetic bearing.

At activity 12400, a plurality of sensors can be obtained. The plurality of sensors can be adapted to be installed between a corresponding pair of electromagnets. The plurality of sensors can be adapted to detect a radial position of a rotating portion of the magnetic bearing relative to the static portion of the magnetic bearing.

At activity 12500, support plates can be obtained. The support plates can be adapted to, in certain operative embodiments, hold the plurality of electromagnets in a substantially fixed position relative to the plurality of wedge volumes.

At activity 12600, a plurality of annular circuit boards can be obtained. At least one of the plurality of annular circuit boards can be communicatively coupled to the plurality of electronic circuits. At least one of the plurality of annular circuit boards can be adapted to provide electrical energy to the electronic circuits.

At activity 12700, touchdown rings can be obtained. The touchdown rings can be adapted to rest on corresponding touchdown journals of a magnetic bearing when the magnetic bearing is not energized.

At activity 12800, the static portion of the magnetic portion of the magnetic bearing can be assembled. The static portion of the magnetic bearing can comprise:
one or more support plates;
a plurality of wedge volumes;
a plurality of electromagnets;
a plurality of sensors;
one or more annular circuit boards; and/or
one or more touchdown rings, etc.

At activity 12900, a rotating portion of the magnetic bearing can be assembled. The rotating portion of the magnetic bearing can comprise:
a hub;
a plurality of laminations;
one or more sensor target rings; and/or
one or more touchdown journals, etc.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:
there is no requirement for the inclusion of any particular described or illustrated characteristic, function, activity, or element, any particular sequence of activities, or any particular interrelationship of elements;
any elements can be integrated, segregated, and/or duplicated;
any activity can be repeated, performed by multiple entities, and/or performed in multiple jurisdictions; and
any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising:
a rotor comprising:
a radial magnetic bearing rotating portion comprising:
a hub;
a plurality of laminations;
a sensor target ring;
a first touchdown journal; and
a second touchdown journal; and
a stator comprising:
a radial magnetic bearing static portion comprising:
three or more electromagnets, each electromagnet comprised by an electromagnet sector;
a first support plate adapted to support said electromagnet sectors;
a second support plate adapted to support said electromagnet sectors;
three or more pulse width modulated amplifiers, each adapted to provide electrical energy to a corresponding electromagnet of said three or more electromagnets, each of said three or more pulse width modulated amplifiers comprised by a corresponding wedge volume, each wedge volume radially disposed between a pair of said three or more electromagnets;
a first annular circuit board adapted to accept a communicative connection from a network;
a second annular circuit board adapted to provide control signaling to said three or more pulse width modulated amplifiers;
a plurality of position sensors adapted to detect a radial position of said rotor, each of said plurality of position sensors located between a pair of three or more electromagnets;
a touchdown ring adapted to separate said rotor from said stator when no electrical energy is applied to said radial magnetic bearing; and
a thrust magnetic bearing static portion comprising:
two or more electromagnets;
two or more pulse width modulated amplifiers, each adapted to provide electrical energy to a corresponding electromagnet of said two or more electromagnets, each of said two or more pulse width modulated amplifiers comprised by a corresponding wedge volume, each wedge volume radially disposed between a corresponding pair of said two or more electromagnets;
a first annular circuit board adapted to accept a communicative connection from a network; and
a second annular circuit board adapted to provide control signaling to said two or more pulse width modulated amplifiers.

2. A system comprising:
a stator comprising:
a first radial magnetic bearing static portion comprising:
three or more electromagnets, each electromagnet comprised by a modular electromagnet sector; and
three or more pulse width modulated amplifiers, each adapted to provide electrical energy to a corresponding electromagnet of said three or more electromagnets, each of said three or more pulse width modulated amplifiers comprised by a corresponding wedge volume, each wedge volume radially disposed between a pair of said three or more electromagnets.

3. The system of claim 2, further comprising:
a junction box adapted to electrically couple said first radial magnetic bearing static portion to an energy source.

4. The system of claim 2, further comprising:
a second radial magnetic bearing static portion.

5. The system of claim 2, further comprising:
a first radial magnetic bearing rotating portion adapted to be magnetically coupled to said first radial magnetic bowing static portion.

6. The system of claim 2, further comprising:
a first radial magnetic bearing rotating portion adapted to be magnetically coupled to said first radial magnetic bowing static portion, said first radial magnetic bearing rotating portion comprising:
a hub;
a plurality of laminations;
a sensor target ring;
a first touchdown journal; and
a second touchdown journal.

7. The system of claim 2, further comprising:
a support plate adapted to support said three or more electromagnets.

8. The system of claim 2, further comprising:
a first support plate adapted to support said three or more electromagnets; and
a second support plate adapted to support said three or more electromagnets.

9. The system of claim 2, further comprising:
an annular circuit board adapted to accept a communicative connection from a network.

10. The system of claim 2, further comprising:
an annular circuit board adapted to provide control signaling to said three or more pulse width modulated amplifiers.

11. The system of claim 2, further comprising:
a first annular circuit board adapted to accept a communicative connection from a network; and
a second annular circuit board adapted to provide control signaling to said three or more pulse width modulated amplifiers.

12. The system of claim 2, further comprising:
an annular circuit board adapted to accept a communicative connection from a network, said annular circuit board comprising a communications port.

13. The system of claim 2, further comprising:
a plurality of position sensors adapted to detect a radial position of a rotor associated with said stator, each of said plurality of sensors located between a corresponding pair of said three or more electromagnets.

14. The system of claim 2, further comprising:
a plurality of position sensors adapted to detect a radial position of a rotor associated with said stator, each of said plurality of sensors located between a corresponding pair of said three or more electromagnets, wherein said plurality of sensors comprises eight sensors, each offset by approximately 45 degrees.

15. The system of claim 2, further comprising:
a touchdown ring adapted to separate a rotor from said stator when no power is applied to said first radial magnetic bearing.

16. The system of claim 2, further comprising:
a thrust magnetic bearing static portion comprising two or more electromagnets.

17. The system of claim 2, wherein an air gap between a rotating portion of a magnetic bearing comprising said magnetic bearing static portion and said magnetic bearing static portion is less than approximately 0.020 inches.

18. The method of claim 2, wherein a gap defined between a first touchdown ring of a magnetic bearing comprising said magnetic bearing static portion and a rotating portion of said magnetic bearing is less than approximately 0.010 inches.

19. A system comprising:
a stator comprising:
a thrust magnetic bearing static portion comprising:
two or more electromagnets, each electromagnet comprised by a modular electromagnet sector; and
two or more pulse width modulated amplifiers, each adapted to provide electrical energy to a corresponding electromagnet of said two or more electromagnets, each of said two or more pulse width modulated amplifiers comprised by a corresponding wedge volume, each wedge volume radially disposed between a corresponding pair of said two or more electromagnets.

20. A system comprising:
a stator comprising:
   a support plate adapted to transfer greater than fifty percent of heat provided from an axial face of said stator, said heat generated by components comprising:
      three or more electromagnets comprised by a radial magnetic bearing static portion, each electromagnet comprised by a modular electromagnet sector; and
      three or more pulse width modulated amplifiers, each adapted to provide electrical energy to a corresponding electromagnet of said two or more electromagnets, each of said two or more pulse width modulated amplifiers comprised by a corresponding wedge volume, each wedge volume radially disposed between a corresponding pair of said two or more electromagnets.

* * * * *

UNITED STATES PATENT AND TRADEMARK OFFICE
CERTIFICATE OF CORRECTION

PATENT NO.         : 7,471,022 B2                                   Page 1 of 1
APPLICATION NO.    : 11/525398
DATED              : December 30, 2008
INVENTOR(S)        : Christopher Sortore et al.

It is certified that error appears in the above-identified patent and that said Letters Patent is hereby corrected as shown below:

Column 17, line 53, Claim 5, "bowing" should read --bearing--.

Column 17, line 57, Claim 6, "bowing" should read --bearing--.

Signed and Sealed this

Fifteenth Day of December, 2009

David J. Kappos
*Director of the United States Patent and Trademark Office*